United States Patent [19]
Hayakawa et al.

[11] 3,790,378
[45] Feb. 5, 1974

[54] PROCESS FOR THE FORMATION OF POLYMER IMAGES

[75] Inventors: Yoshihide Hayakawa; Masato Satomura, both of Asaka, Japan

[73] Assignee: Fuji Photo Film Co., Ltd., Minami-Ashigara-shi, Kanagawa, Japan

[22] Filed: Feb. 24, 1972

[21] Appl. No.: 232,316

Related U.S. Application Data

[63] Continuation of Ser. No. 873,710, Nov. 3, 1969, abandoned.

[30] Foreign Application Priority Data
Nov. 2, 1968  Japan.............................. 43-80115

[52] U.S. Cl. ................. 96/48 R, 96/35.1, 96/115 P
[51] Int. Cl............................ G03c 1/68, G03c 1/70
[58] Field of Search.................... 96/35.1, 48, 115 P

[56] References Cited
UNITED STATES PATENTS

| | | | |
|---|---|---|---|
| 3,019,104 | 1/1962 | Oster...................................... | 96/29 |
| 3,585,030 | 6/1971 | Pelz et al. ............................. | 96/29 |
| 2,887,376 | 5/1959 | Tupis..................................... | 96/35 |

*Primary Examiner*—Ronald H. Smith
*Attorney, Agent, or Firm*—Sughrue, Rothwell, Mion, Zinn and Macpeak

[57] ABSTRACT

Process for forming a polymer image by contacting at least one of o-dioxybenzene, o-aminophenol, o-phenylenediamine, pyrogallol or derivatives thereof with a silver halide photographic layer having a photographic latent image in the presence of a polymerizable vinyl compound and sulfite ions to polymerize the vinyl compound selectively at those areas containing the latent image.

30 Claims, No Drawings

PROCESS FOR THE FORMATION OF POLYMER IMAGES

This is a continuation of application Ser. No. 873,710, filed Nov. 3, 1969 and now abandoned.

BACKGROUND OF THE INVENTION

1. Field of the Invention

The present invention relates to a process for the formation of polymer images and more particularly to a process for selectively forming polymer images at areas corresponding to photographic latent image-bearing areas by the actions of a photographic silver halide emulsion and a reducing agent.

2. Description of the Prior Art

There have been proposed various processes of forming images by the formation of highly polymerized compounds by photopolymerization of vinyl compounds. It has also been proposed to directly cause photopolymerization using silver halide as a catalyst (cf,: British Patent No. 866,631: S. Levinos et al., "Photographic Science & Engineering"; Vol. 6, 222–226 (1962)). It is considered, in this reaction, that the photoinduced-decomposition product of silver halide serves directly as a polymerization catalyst and the light-sensitivity of the reaction does not reach the level which is easily attained by ordinary development of silver halide particles.

It has also been proposed to form imagewise highly polymerized compounds by polymerizing vinyl compounds using as a catalyst a silver image or unreacted silver halide after development of an exposed silver halide emulsion with an ordinary developing solution. (cf.: Belgian Patent No. 642,477). This procedure has the disadvantage that the development and the polymerization process must be conducted separately.

It is theoretically of great interest to cause the polymerization of vinyl compounds by the oxidation product or an intermediate thereof formed in the course of the development of a photographic silver halide emulsion by a reducing agent in the presence of the vinyl compounds, since it can be expected that, in such a procedure, the polymerization will be affected by both an amplification effect of development and an amplification affect of chain polymerization. It has been proposed to cause such a reaction, using as the reducing agent a so-called benzenoid compound having at least two hydroxyl groups, amino groups, alkyl-substituted amino groups, or aryl-substituted amino groups in the ortho- or para-positions with respect to each other on the benzene ring (cf.: U.S. Pat. No. 3,019,104; G. Oster; "Nature"; Vol. 180, 1275 (1957)).

Moreover, other investigators have reported that they could not succeed in reproducing the experiments of the procedure (S. Levinos and F.W.H. Mueller; "Photographic Science & Engineering"; Vol. 6, 222 (1962)).

The aforesaid patent does not indicate any difference between the para-substituted and the ortho-substituted compounds and in the examples of the patent, only the para-substituted compounds are used.

Applicants, however, have found that there are remarkable differences between the use of the ortho-substituted compounds and the use of the para-substituted compounds; that is, under conditions causing no polymerization in the case of using the para-substituted compounds, the ortho-substituted compounds can serve as initiators of development and polymerization simultaneously. Further, it has not been found under any conditions that the para-substituted compounds cause development and polymerization at the same time. Hydroquinone, one of the para-substituted compounds and the oxidation products thereof are well known compound polymerization inhibitors and even when such compounds are used in high concentrations, the polymerization occurs to only a very slight extent.

SUMMARY OF THE INVENTION

An object of the present invention is to convert, by a simple procedure, a latent image, formed by the irradiation with electromagnetic waves or particle rays, into a high molecular weight compound image.

A further object of the present invention is to provide a polymer image having desirable properties for recording or printing by utilizing the above procedure.

Applicants have discovered that the polymerization of a vinly compound may be caused by reducing a silver halide in the presence of the vinyl compound and/or sulfite ions with o-dioxybenzene, o-aminophenol, o-phenylenediamine, pyrogallol or a derivative thereof as disclosed hereinafter.

Moreover, it has been found that when a silver halide photographic emulsion is used as the silver halide in the aforesaid procedure, the reaction proceeds more rapidly where the fine crystals of the silver halide grains contain centers of development. Accordingly, by selecting proper reaction conditions and reaction time, the polymerization can be effected selectively only in those areas of the layer where silver halide particles having centers of development exist.

DETAILED DESCRIPTION OF THE INVENTION

The present invention is attained by utilizing the above-mentioned facts. That is, the present invention is attained by contacting o-dihydroxybenzene, o-aminophenol, o-phenylenediamine, pyrogallol, or a derivative thereof with a silver halide photographic layer having a photographic latent image in the presence of a polymerizable vinyl compound and sulfite ions, whereby the polymerization of the vinyl compound is effected selectively only at those areas where the silver halide emulsion bearing the latent image exists.

The o-dihydroxybenzene, o-aminophenols, and o-phenylenediamines applicable to the present invention may be generically described as follows:

Formula I (o-dihydroxybenzene and its derivatives):

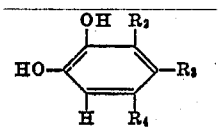

wherein $R_2$ represents a hydrogen atom or a hydroxyl group, $R_3$ represents a hydrogen atom or an alkyl group, $R_4$ represents a hydrogen atom or a methoxycarbonyl group, and $R_2$ and $R_3$ may be connected to another ring through an ether-bonded oxygen atom or carbonyl group;

Formula II (o-aminophenol and its derivatives):

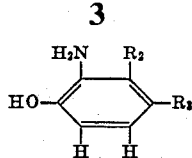

wherein $R_2$ represents a hydrogen atom or a hydroxyl group and $R_3$ represents a hydrogen atom or an amino group; and Formula III (o-phenylenediamine and its derivatives):

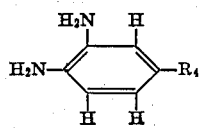

wherein $R_4$ represents a hydrogen atom, an alkyl group or an amino group.

By "photographic latent image" it is meant an invisible imagelike area formed on a silver halide photographic emulsion layer by the action of electromagnetic waves or particle rays and which can be converted into a visible image by development. In an ordinary silver halide photographic emulsion layer for forming a negative image, the latent image is formed by the formation of development centers on the silvery halide particles irradiated by electromagnetic waves or particle rays, while in a photographic emulsion layer utilized for forming a direct positive image, the latent image is formed by providing development centers in all of the silver halide particles present in the emulsion layer and then removing the development centers by the irradiation with electromagnetic waves or particle rays (cf.: James and Huggins; "Fundamentals of Photographic Theory"; 2nd edition, paragraphs 3 and 4 (1960), published by Morgam & Morgam Co.).

In the present invention, there may be used an ordinary silver halide emulsion that forms centers of development in the areas irradiated by electromagnetic waves or particle rays providing negative images by development, and there may also be employed the so-called direct positive silver halide emulsion that forms less development center-bearing areas at the emulsion layer subjected to imagewise exposure.

In the present invention, a silver halide photographic emulsion which is treated by an ordinary development process may be conveniently used as the silver halide emulsion providing negative images. That is, silver chloride, silver bromide, silver chlorobromide, silver iodobromide, and silver chloroiodobromide photographic emulsions may be employed. A chemical sensitization and/or optical sensitization which is applicable to ordinary photographic emulsions can be applied to the silver halide photographic emulsion for the purposes of the present invention. Examples of applicable chemical sensitization would be sulfur or noble metal sensitization (cf.: P. Glafkides; "Chimie Photographique"; 2nd edition, Photocinema Paul Montel, Paris, 1957, pages 247–301). As examples of optical sensitization may be mentioned optical sensitizers ordinarily employed for photographic emulsions, such as cyanine dyes and merocyanine dyes (see, for example, Kikuchi et al.; "Kagaku Shashin Benran" (Handbook of Scientific Photography), Vol. II, 15–24 (1959), published by Maruzen Co.). Moreover, the silver halide photographic emulsions of the present invention may also contain stabilizers as employed in conventional photographic techniques.

A direct positive silver halide emulsion which can be employed in the present invention may be prepared, for example, by solarization, Herschel effect, Clayden effect or Sabatier effect. These effects are explained in Chapters 6 and 7, by C. E. K. Mees, of "The Theory of the Photographic Process"; 2nd edition, published by McMillan Co., 1954.

For preparing a direct positive silver halide photographic emulsion by solarization, a silver halide emulsion layer susceptible to solarization is prepared and then subjected to uniform exposure to light or to a chemical action to render it developable without imagewise exposure. The methods of preparing such silver halide emulsions are disclosed in, for example, the specifications of British Patent Nos. 443,245 and 462,730.

The Herschel effect is produced by exposing to a light of longer wave length a photographic emulsion which has been rendered developable by a uniform exposure to light of shorter wave length or a uniform action of a chemical agent. In this case, it is preferable to employ a silver halide emulsion containing silver chloride for the most part and to use a desensitizing dye such as pynakryptol yellow or phenosafranine for enhancing the effect. Methods of preparing direct positive silver halide emulsions utilizing the Herschel effect are disclosed in, for instance, the specifications of British Patent No. 667,206 and U.S. Pat. No. 2,857,273.

In order to obtain directly a positive image by utilizing the Clayden effect, it is necessary to subject a silver halide emulsion to overall exposure to light of a relatively low intensity after imagewise exposure to light of a high intensity for a short period of time, and the areas of the emulsion layer which have not been exposed to the high intensity light become developable after this overall exposure.

The Sabatier effect is produced by subjecting a silver halide emulsion layer to an imagewise exposure and thereafter subjecting the emulsion layer to an overall exposure while the emulsion layer is immersed in a developer or subjected to the action of a chemical reagent to provide developability to the areas which have not been subjected to the imagewise exposure.

The Clayden effect and the Sabatier effect can be readily and practically produced in silver halide emulsions that have a tendency of yielding centers of development by the first exposure in the inner portions rather than the surface portions of the silver halide. The methods of preparing silver halide emulsions having a tendency to provide internal centers of development are disclosed in the specifications of, for instance, U.S. Pat. Nos. 2,592,250 and 2,497,876; and British Patent No. 1,011,062; and German Patent No. 1,207,791.

The photographic emulsion as mentioned above consists of a dispersion system in which the particles of silver halide are dispersed in a solution of a high molecular weight material. As the high molecular weight material, gelatin is widely used, although synthetic high polymers such as polyvinyl alcohol, polyvinyl pyrrolidone, and polyacrylamide as well as derivatives of natural high polymers such as carboxymethyl cellulose, cellulose oxyethyl ether, and dextran may be employed, either alone or in mixtures with gelatin (cf.: F. Evva; "Zeitschrift fur Wissenschaftliche Photographie, Photophysik and Photochemie"; Vol. 52, 1–24 (1957)).

Examples of the o-dioxybenzenes, o-aminophenols, o-phenylene-diamines, and derivatives thereof which are useful in the present invention which may be mentioned are catechol, 4-methylcatechol, 4-t-butyl catechol, pyrogallol, methyl gallate, pyrogallol red, o-aminophenol, amidol, 2-aminoresorcinol, o-phenylenediamine, tolylene-3, 4-diamine, 1,2,4-triaminobenzene, alizarine, and the like.

These compounds may either be prepared by well known methods or are commercially available.

In the present invention, silver halide is used in the form of a silver halide photographic emulsion layer to increase the difference in reactivity between areas irradiated by electromagnetic waves or particle rays and areas not irradiated, that is, to increase the selectivity of reaction.

Oxidation of the reducing agent used in the invention, for example, 4-t-butyl catechol, is reported in T.J. Stone & W. A. Waters; "Journal of Chemical Society," 1488 (1965 wherein the reducing agent was treated with ferric salt under alkaline conditions and the measurement of the electron spin density on the ring at the oxidation intermediate was determined.

The oxidation of catechol is also reported by the above researchers in "Journal of Chemical Society"; 408 (1964).

According to their speculations, the reaction is considered to proceed as follows:

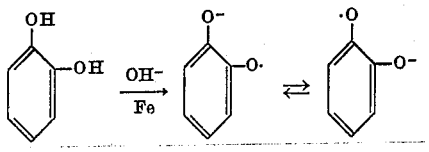

The reaction mechanism for the initiating of the polymerization of vinyl compounds as the result of the reduction of silver halide by the aforesaid compounds in the present invention has not yet been cleared or completely determined. However, it is generally considered that the polymerization proceeds by a free radical mechanism since a compound capable of causing free radical polymerization can be utilized in the reaction and the reaction proceeds in an aqueous solution and that a free radical polymerization inhibitor retards the reaction.

It has not yet been confirmed whether free radicals are formed directly by the reaction of the compound in the present invention with a silver halide, or whether free radicals are formed by action with water, oxygen, etc., in the reaction system. However, although the influence of oxygen is unknown from the aforesaid publications, it is generally considered that the reaction occurs as follows:

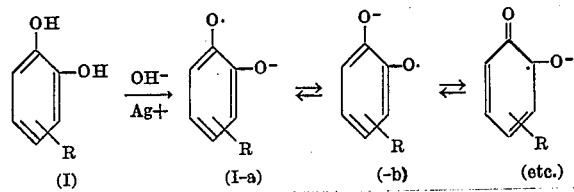

The radical represented by (I-a) or (I-b) described above is pre-sumed to initiate the polymerization.

Also, when a vinyl compound is added to the reaction system after reducing silver halide particles irradiated by electromagnetic waves or particle rays with the compound of this invention, the occurrence of polymerization is not observed. Thus, it is clear that the polymerization of the vinyl compound occurs at the same time the silver halide is reduced. It is, therefore, considered that an intermediate product of the silver halide and the compound of the present invention contributes to the reaction.

Furthermore, when the reaction is stopped after a proper period of time, a high molecular weight compound is formed selectively only at the areas irradiated, but when the above reaction is further continued, the high molecular weight compound is formed also at the areas which have not been irradiated. These facts are considered to be caused by the difference in reactivity between the irradiated silver halide and unirradiated silver halide.

However, the phenomena of high molecular weight compound formation at both unexposed and exposed areas when the reaction is continued for a longer period of time is similar to the phenomena termed "fog," which occurs when development is continued for a longer period of time in ordinary photographic processes and in which the whole silver halide photographic emulsion layer becomes blackened. Hence the aforesaid problem does not affect the practicability of the present invention.

When p-aminophenol or hydroquinone are used in substantially the same concentration as that of the reducing agents of the present invention, development occurs, but no polymerization of vinyl compound occurs. This fact is considered to result from the fact that the stability of a semiquinone radical, formed by the reaction of the reducing agent and silver halide, is extremely different as between the p-substituted and the o-substituted compounds. As is well known, hydroquinone is a polymerization inhibitor as well as being a well-known developing agent. Catechol, which is one of the reducing agents which may be used in the present invention, is also used as a developing agent, but when it is used as a reducing agent in a low concentration and under alkaline conditions, as in the present invention, the semiquinone radical formed is very unstable (the aforesaid report also teaches that the semiquinone radical of catechol is readily dimerized) and hence the radical is considered to act merely as an initiator for the polymerization reaction.

Although the pH of the reaction system and the concentration of the reducing agent are not generally defined, the development and polymerization can be conducted in even a higher concentration of the reducing agent as the content of amino group is raised, which is considered to be based on the difference in stability between the intermediate products formed by oxidation.

As a process for forming an image of a high molecular weight material by utilizing the light sensitivity of silver halide, there is known a so-called tanning developing process wherein the cross-linking of gelatin is effected by the oxidation product of a well-known developing agent. However, in this known process, the image formed is limited to the areas where the gelatin is cross linked. On the other hand, in the present invention, polymer images having various desired properties can be obtained in accordance with the vinyl compounds to be employed, and thus various desirable properties such as dyeing properties and chemical resistance, which have never been obtained by the process of cross linking gelatin, can be obtained, which is a feature of the present invention.

Moreover, applicants have found that in the process of the present invention the polymerization of vinyl compounds can be accelerated when sulfite ions are present in the reaction system.

Sulfite ions may be added to the reaction system either in the form of a compound originally having the sulfite ions, such as alkali metal or ammonium sulfite or alkali metal or ammonium bisulfite, or in the form of a compound which will give sulfite ions as a result of hydrolysis, such as pyrosulfites of alkali metals or ammonium or the adducts of bisulfites with aldehydes such as formaldehyde or glyoxal. The appropriate amount of sulfite ions to be added depends upon the kind and amount of reducing agent and the vinyl monomer to be used and the pH of the reaction system.

More than 0.05, especially more than 0.2 mole per liter of the system has generally been found to be effective.

It is well know to add a sulfite to a photographic developing solution. It is believed that the sulfite prevents the auto-oxidation of the developing agent and the occurence of uneven development by reaction with the oxidation product of the developing agent, such as hydroquinone or p-aminophenol (cf.: for example C. E. K. Mees, "The Theory of the Photographic Process"; 2nd edition, page 652; published by McMillan Co. (1954)). It should be noted that since the intermediate product of the oxidation of the o-dioxybenzene, o-aminophenol, o-phenylenediamine, pyrogallol, or a derivative thereof by silver halide initiates the polymerization of vinyl compounds in the process of the present invention, the polymerization accelerating action of the sulfite ions is essentially different from the action of removing the oxidation products as in ordinary developing solutions as mentioned above. The polymerization would be inhibited, rather than accelerated, if the sulfite simply removed the oxidation product.

While the mechanism of the action of sulfite ions in the process of the present invention is not yet clear, it would appear that the sulfite ions prevent the polymerization inhibiting action of oxygen.

The vinyl compounds to be employed in the present invention includes compounds which are either liquid or solid at room temperature and are capable of addition polymerization and mixtures thereof. Examples of such vinyl compounds are acrylamide, acrylonitrile, N-hydroxymethylacrylamide, methacrylic acid, acrylic acid, calcium acrylate, sodium acrylate, N-t-butyl acrylamide, methyl methacrylate, methyl acrylate, ethyl acrylate, vinylpyrrolidone, vinylmethyl ether, vinylbutyl ether, vinyl isopropyl ether, vinyl isobutyl ether, vinyl butyrate, 2-vinylpyridine, 4-vinylpyridine 2-methyl-N-vinyl imidazole, potassium vinylbenzene sulfonate, and vinyl carbazole dicyclopentadiene methacrylate. For the present invention, compounds having two or more vinyl groups are particularly suitable. Such compounds may be used alone or in mixtures with the monovinyl compound as mentioned above. Examples of such compounds are N,N'-methylene-bisacrylamide, ethylene glycol dimethacrylate, diethylene glycol dimethacrylate, triethylene glycol dimethacrylate, polyethylene glycol dimethacrylate, divinyl ether, divinyl benzene, bisphenol-A-dimethacrylate, butylene-dimethacrylate, pentaerythritol tetraacrylate and the like.

Although it is convenient for the present invention to employ water-soluble vinyl compounds, water-insoluble vinyl compounds may be employed by adding the vinyl compound as an emulsion to the reaction system. The emulsification of the water-insoluble vinyl compound may be conducted by a suitable stirring means in the presence of a surface active agent and/or a high molecular weight compound in accordance with conventional practice.

Any of electromagnetic waves or particle rays to which ordinary photographic emulsions are sensitive may be used in the present invention. For example, visible rays, ultraviolet rays, infrared rays having wave lengths of shorter than 1.3 microns, X-rays, gamma rays, electron beams, and alpha rays can be used.

In carrying out the present invention, it is necessary to conduct two steps or irradiation by electromagnetic waves or particle rans and of reduction and polymerization. In particular, for the recording of images, it is desirable that the silver halide particles change their positions little during the period between the irradiation and the polymerization of the vinyl compound in the reaction system. Accordingly, it is desirable that the reaction system be maintained in a highly viscous liquid or in a gel state. While photographic emulsions have some viscosity and are susceptible to gelation since they contain natural or synthetic high molecular weight material, an additional molecular weight material may be added to the emulsion if the viscosity thereof is insufficient.

For the purpose or irradiating the silver halide particles, they may be dispersed in an aqueous solution or held in a dry gel. That is, a highly viscous or gelled photographic silver halide emulsion on a suitable support may be subjected to the irradiation either in the dried state or the undried state. As the reduction and polymerization take place at the same time, the reduction must be conducted in the presence of the vinyl compound. Furthermore, in the present invention, the ortho-type benzenoid developing agent, which acts as the reducing agent for silver halide may be present in the silver halide emulsion together with the vinyl compound, or either one may be incorporated preliminary in the silver halide emulsion and, after irradiation, the other may be added to the system. Moreover, both of them may be added to the system after irradiation.

The combined reduction and polymerization reaction requires the presence of water and accordingly the reaction must be conducted in an aqueous solution or in a humid gel state.

The reaction of the present invention proceeds well in an alkaline state. The optimum pH value of the system depends upon the kind and concentration of the silver halide, the reducing agent, and the high molecular weight material used as medium or binder, as well as the reaction temperature, but the reaction is generally carried out at a pH of higher than about 6, in particular, higher than 7.

When using the photographic silver halide emulsion coated on a support, the reaction can be conducted by immersing the ligh-sensitive element formed, after irradiation, in an alkaline aqueous solution. It is convenient to incorporate the reducing agent or the vinyl compound in the alkaline aqueous solution.

Although the reaction is readily stopped by adjusting the pH of the system to acidity, e.g., less than 5, the reaction may also be stopped by cooling, removing the reactants by washing, dissolving the silver halide by a fixing solution for photographic processing, or adding a polymerization inhibitor to the reaction system.

When the high polymer which forms the medium for silver halide and the monomeric vinyl compound are coated as a layer, it is desirable to incorporate a small amount of a thermal polymerization inhibitor in the layer in order to prevent the spontaneous over-all thermal polymerization of the vinyl compound before processing. As such thermal polymerization inhibitors, any of the compounds that are known as thermal polymerization inhibitors in ordinary free radical polymerization may be utilized: for example, p-methoxyphenol, hydroquinone, alkylhydroquinone, 2,6-di-t-butyl-p-cresol, and the like.

In the case of preliminarily incorporating the vinyl compound in the reaction system, the weight of the vinyl compound to be used should be 1/30 to 30 times, preferably ¼ to 4 times the weight of the high molecular weight material to be used preliminary. The weight of the silver halide to be used should be 1/20 to 2 times, preferably 1/10 to ½ times the weight of the high molecular weight material used. Moreover, in the case of incorporating the reducing agent mentioned above in the reaction system, the amount of the reducing agent is preferably 1/1000 to 20 moles per 1 mole of silver halide used.

Also, in the case of employing a thermal polymerization inhibitor, the amount thereof should be about 10 ppm. to 1/100 of the weight of the vinyl compound or compounds to be employed. In the case of adding the vinyl compound or compounds in the processing solution, it is usually preferred that the concentration thereof be as high as possible, or the amount to be added in the solution is rather controlled by the solubility of the vinyl compound in the processing solution.

When the reducing agent used in the present invention is incorporated in the processing solution, the optimum concentration thereof depends on the structure of the reducing agent and the pH of the reaction system, but the concentration is generally 1/10000 mole to 3 moles, preferably 1/3000 to 1 mole per liter.

As in any ordinary silver halide photographic process, there can be any interval of time between the irradiation and the polymerization process. In some cases, the effect of the irradiation may be reduced to some extent according to the properties of the photographic emulsion to be used, the conditions and the period of storing the emulsion, and in such a case, a more desirable effect can be obtained by increasing the amount of the irradiation. In the case of applying the process of the present invention to the recording of images, it is possible to make use of differences in solubility, light-scattering properties, tackiness, dye-receptivity and other physical and chemical properties between the vinyl compound and the polymer thereof. By dissolving away the unpolymerized portions after subjecting the system to the irradiation and the polymerization reactions, by utilizing the difference in solubility to leave a polymer image at only the portion irradiated, a relief image can be formed.

In this case, it is preferred that the high molecular weight material originally present in the system be washed away together with the unreacted monomer. For this purpose, it is preferably that the high molecular weight material originally present in the system be a linear, substantially uncross-linked polymer or, if cross-linked, one that is susceptible to chain fission or break-up of the cross-linkages and that the highly polymerized compound formed by the polymerization of the vinyl compound be a cross-linked polymer or a polymer of three-dimensional structure. Thus, it is preferred to employ a compound having a plurality of vinyl groups, as mentioned above, either alone or in combination with a compound having one vinyl group. However, it is not essential to employ a compound having a plurality of vinyl groups, since there are many cases where a great difference in solubility exists between the monomer and the polymer formed therefrom, even if the high molecular weight compound formed is a two-dimensional, or linear, water-soluble high polymer, due to the interaction of the compound formed by the polymerization and the high polymer originally present in the reaction system, for example, polyacrylic acid or gelatin.

The high polymer image formed by the process of this invention can be employed in various printing processes.

Also the present invention can be utilized for forming colored images or dye images. In this process, the polymerization is conducted using a monomer having a group capable of taking a charge by electrolytic dissociation or the addition of hydrogen cation, and thereafter the image of the polymer may be selectively dyed by a dye having a charge of a polarity opposite to that of the polymer. Moreover, the colored image thus obtained can be transferred to other supports by various methods.

As such addition-polymerizable vinyl compounds which can be charged by electrolytic dissociation or the addition of hydrogen cation and to be used in the aforesaid color image forming process, there may be mentioned the following. As monomers providing a negative charge to the high molecular weight compound formed by the polymerization of the monomer, there are vinyl compounds having a carboxyl group, such as acrylic acid, methacrylic acid, itaconic acid, and maleic acid; vinyl compounds having an ammonium salt or a metal salt of a carboxylic group, such as ammonium acrylate, sodium acrylate, potassium acrylate, calcium acrylate, magnesium acrylate, zinc acrylate, cadmium acrylate, sodium methacrylate, calcium methacrylate, magnesium methacrylate, zinc methacrylate, cadmium methacrylate, sodium itaconate, and sodium maleate; vinyl compounds having a sulfonic acid group, such as vinyl sulfonate, and p-vinylbenzene sulfonate; and vinyl compounds having an ammonium salt or metal salt of sulfonic acid, such as ammonium vinylsulfonate, sodium vinylsulfonate, potassium vinylsulfonate, potassium p-vinylbenzene sulfonate, and the like. As monomers providing a positive charge to the high molecular weight compound formed from the monomer, there are vinyl compounds having a basic nitrogen atom, such as 2-vinylpyridine, 4-vinylpyridine, 5-vinyl-2- methylpyridine, N,N-dimethylaminoethyl acrylate, N,N-dimethylaminoethyl methacrylate, N,N-diethylaminoethyl acrylate, and N,N-diethylaminoethyl methacrylate and vinyl compounds having a nitrogen of a quaternary salt formed by the reaction of the bases of the above vinyl compounds and methyl chloride, ethyl bromide, dimethyl sulfate, diethyl sulfate, or methyl p-toluenesulfonate or the like.

These compounds either may be prepared by well known methods or are commercially available. These compounds may be used alone or in combination. Also, they may be used as a mixture with a water-soluble addition-polymerizable vinyl monomer having no charge. Examples of vinyl compounds which may be used with the aforesaid vinyl monomers are acrylamide, N-hydroxymethyl acrylamide, methacrylamide, methyl methacrylate, vinylpyrrolidone, N,N-methylenebis(acrylamide), triethylene-glycol dimethacrylate, polymethylene glycol dimethacrylate, and the like. In the case of employing a vinyl compounds having no charge together with the aforesaid vinyl compound having a charge, the relation between the reactivity thereof and the amount employed should be adjucted so that a high molecular compound containing substantially no group capable of being electrolytically dissociated is not formed.

As dyes capable of being charged by electrolytic dissociation, there are generally used ordinary acid and basic dyes. When a vinyl compound providing a high molecular weight compound having a negative charge is used, a basic dye is employed, while when a vinyl compound providing a high molecular weight compound having a positive charge is used, an acid dye is employed. In other words, as the basic dye has a positive charge, it selectively dyes the high molecular weight compound having negative charge, whereas as the acid dye has a negative charge, it dyes the high molecular weight compound having positive charge. Thus, a dye image or colored image is obtained in conformity to the high molecular weight compound formed imagewise.

When gelatin is used as a binder for photographic silver halide emulsions, the isoelectric point of the gelatin should be considered during dyeing since gelatin is an amphoteric electrolyte. That is, gelatin has a negative charge at a pH higher than the isoelectric point of the gelatin which it has a positive charge at a pH lower than the isoelectric point thereof. Accordingly, in the case where a high molecular weight compound having a negative charge is formed, the high molecular weight material is dyed by a basic dye at a pH lower than the isoelectric point of gelatine to be used, whereby only the polymer image can be dyed without dyeing the gelatin. Furthermore, in such a case, the following procedure may be applied. That is, by first dyeing uniformly the surface of the photographic emulsion layer bearing the polymer image at a pH higher than the isoelectric point of gelatin and then washing the surface thereof with a solution having a pH lower than the isoelectric point, the dye at the areas having no polymer image is washed away to provide the dyed polymer image.

In the case of dyeing a polymer image having a positive charge with an acid dye, the dyeing may be conducted at a pH higher than the isoelectric point of gelatin. If the pH is too high or too low, the solubility of dye will be reduced or the electrolytic dissociation of the high molecular weight compound to be provided with charges thereby will be disturbed. Thus, although the optimum pH range depends upon the kinds of the vinyl compound, the dye, and the binder, such as gelatin, to be used, it is suitable 2.5–4.5 when an ordinary lime-treated gelatin having an isoelectric point of about 4.9 is employed and the image of a high molecular weight compound having a negative charge is dyed with a basic dye, while the pH is suitably 5.0–8.0 when the aforesaid gelatin is used and the image of high molecular weight compound having a positive charge is dyed with an acid dye.

Examples of acid dyes which may be employed in the present invention are C.I. Acid Yellow 7 (C.I. 56, 105); C.I. Acid Yellow 23 (C.I. 19, 140); C. I. Acid Red 1 (C. I. 18, 050); C. I. Acid Red 52 (C. I. 45, 100); C. I. Acid Blue 9 (C. I. 42, 090); C.I. Acid Blue 45; C. I. Acid Blue 62 (C. I. 62, 045); C. I. Acid Violet 7 (C. I. 18, 055); and the like. Examples of basic dyes are C. I. Basic Yellow 1 (C. I. 49, 005); C. I. Basic Yellow 2 (C. I. 41, 000); C. I. Basic Red 1 (C. I. 45, 160); C. I. Basic Red 2 (C. I. 50, 240); C. I. Basic Blue 25 (C.I. 52, 025); C. I. Basic Violet 3 (C. I. 42, 555); C. I. Basic Violet 10 (C. I. 45, 170); and the like.

The C. I. number indicated above is cited from Color Index (2nd edition) and the aforesaid dyes are all commercially available under various trade names.

In the practice of the process of this invention, it is necessary to conduct the irradiation and thereafter conduct the reduction and polymerization.

By washing away the unpolymerized vinyl monomer or monomers after conducting the irradiation, reduction and polymerization according to the process of the present invention, a polymer image can be obtained. That is, since the polymer has low solubility as compared with the monomer and also since a high molecular weight material, such as gelatin, originally present in the system as a binder for the silver halide photographic emulsion, is left without being dissolved in water, the polymer is only slightly diffused into the gelatin layer, only the polymerized portions are left to form images. By using a vinyl monomer having two or more vinyl groups, the insolubility and the diffusion resistance properties of the polymer can further be enhanced.

By dyeing as mentioned above after conducting the polymerization, a color image of the polymer image can be obtained. Furthermore, by removing the silver halide by a fixing procedure and further dissolving away the silver image by the action of an oxidizing agent and solvent for the silver salt, a clear and sharp colored image is obtained. When a reducing agent having a very high polymerization initiating effect is employed, a sufficient polymerization reaction occurs even where a very slight amount of reduced silver is formed and hence in such a case it is scarcely necessary, if at all, to remove the silver image by oxidation.

In the process of the present invention, the dye or colored image formed can be transferred to another support. The transfer of the dye image is carried out by wetting the dye image-bearing layer with a solvent for dye, such as methanol, water, or an aqueous solution of an acid, a base or a salt and closely contacting the layer to a support to which the dye image is transferred. As the transfer support, there may be employed ordinary papers, papers coated with a hydrophilic polymer layer or a gelatin layer, and films coated with a hydrophilic polymer layer or a gelatin layer.

In the case of transferring the dye image onto a support having coated thereon a gelatin layer, it is convenient to use a support treated with a mordant such as an aluminum salt as used in conventional dye transfer processes. When a polymer image having a charge is once formed, a plurality of reproductions can be obtained by repeating the dyeing and transferring as mentioned above. In this case, several copies of the transferred dye image can be obtained from one dyed image. Also, as a large number of dyeings can be applied repeatedly from one polymer image, a large number of reproductions can be easily formed.

The invention will further illustrated by the following examples:

EXAMPLE 1

A photographic light-sensitive film having a gelatino silver chloroiodo-bromide photographic emulsion layer was exposed, processed in a solution containing a reducing agent and sodium acrylate to conduct imagewise polymerization, and the polyacrylic acid image thus formed was dyed with a basic dye.

The photographic light-sensitive film used in the example was prepared as follows: After subcoating the both surfaces of a polyethylene terephthalate film, the one surface of the film was coated with an anti-halation layer and the other surface thereof was coated with a fine grain gelatino silver halide emulsion containing 0.7 mole of chlorine, about 0.3 mole of bromine and about 0.001 mole of iodine per 1 mole of silver and about 100 g. of lime-treated gelatin per 1 mole of silver and also having incorporated therein a merocyanine dye having a maximum sensitivity of 550 m$\mu$. as a sensitizing dye, muchchloric acid as a hardening agent in an amount of about 1.5 g. per 100 g. of gelatin, and suitable stabilizer and surface active agent in such thickness that the layer contained 50 mg of silver per 100 cm.$^2$ of said layer. Thereafter, a protective layer consisting of gelatin was further applied to the emulsion layer in a thickness of about 0.8 microns. The photographic film was the type usually used for forming line and halftone images for photo-mechanical processes. The photographic film was exposed for 2 seconds to light, of about 100 lux through a negative line image and then processed in a solution having the following composition under a red stable light:

| | |
|---|---|
| Sodium methacrylate | 75 g. |
| Reducing agent | shown in Table I |
| Potassium methabisulfite | 3 g. |
| Water | 75 g. |
| 1 N sodium hydroxide | amount necessary to adjust the pH of the solution to the value shown in Table I. |

When the exposed photographic film was processed for a period of time shown in Table I, a faint brown image was formed in the exposed areas. The sample was washed with a 1.5% aqueous solution of acetic acid and then fixed in a fixing solution having the following composition:

| | |
|---|---|
| Sodium thiosulfate (anhydrous) | 150 g |
| Potassium methabisulfite | 15 g |
| Water to make | 1 liter |

After washing with water, the sample was immersed in a 0.1 percent aqueous solution of a red basic dye, Rhodamine 6 G.C.P., (C.I. Basic Red 1) for 5 minutes. Then, when the sample was washed with a 5 percent aqueous acetic acid solution for 5 minutes, the dye at the other areas than those having the faint brown image mentioned above was washed away but the image-bearing portion was colored in red. The faint brown image was a silver image and hence readily removed by a Farmer's reducer. By removing the silver image, a clear and sharp red image was obtained. The removal of the silver image could be conducted before dyeing. That is, a clear and sharp red image as above could be obtained by first removing the silver image and then dyeing the colorless layer.

On these samples, the densities of the exposed portions of the unexposed portions to green light were measured before and after dyeing, respectively, and the results are shown in Table I together with the kinds and amounts of reducing agents, the pH at processing and the processing period of time.

Table I

| No. | Reducing agent | (A) | (B) | (C) (C-1) | (C-2) (C-2) | (C-2) (D-1) | (D) (D-2) | (E) |
|---|---|---|---|---|---|---|---|---|
| 1 | Catechol | 0.05 | 70 | 0.06 | 0.16 | 0.66 | 2.40 | 9.00 |
| 2 | 4-Methyl-catechol | 0.03 | 50 | 0.08 | 0.26 | 0.45 | 1.19 | 9.00 |
| 3 | 4-t-Butyl-catechol | 0.03 | 70 | 0.08 | 0.31 | 0.48 | 1.52 | 9.00 |
| 4 | Pyrogallol | 0.01 | 70 | 0.07 | 0.26 | 0.45 | 1.23 | 9.10 |
| 5 | Methyl gallate | 0.03 | 70 | 0.08 | 0.21 | 0.08 | 1.18 | 9.00 |
| 6 | Pyrogallol red | 0.03 | 70 | 0.11 | 0.31 | 0.13 | 2.10 | 9.00 |
| 7 | o-Aminophenol | 0.05 | 70 | 0.05 | 0.30 | 0.22 | 3.02 | 9.00 |
| 8 | Amidol | 0.01 | 70 | 0.15 | 0.38 | 0.27 | 1.78 | 9.10 |
| 9 | 2-Amino-resorcinol | 0.03 | 30 | 0.09 | 0.29 | 0.14 | 1.33 | 9.00 |
| 10 | o-Phenylene diamine | 0.05 | 70 | 0.08 | 0.26 | 0.08 | 0.75 | 9.00 |
| 11 | Tolylene-3,4-diamine | 0.03 | 70 | 0.07 | 0.20 | 0.08 | 1.33 | 9.00 |
| 12 | 1,2,4-triamino-benzene | 0.01 | 30 | 0.08 | 0.36 | 0.09 | 1.20 | 9.00 |
| 13 | Alizarin | 10.80 | 60 | 0.18 | 0.28 | 0.15 | 0.74 | 11.55 |

(A): amount of reducing agent in grams; (B) processing time in minutes; (D) density of exposed area;
(C) transmission density of unexposed area;
(C-1) before dyeing;
(C-2) after dyeing;
(D-1) before dyeing;
(D-2) after dyeing; and
(E) pH value From the above table, it will be seen that the increase in density by dyeing was higher in the exposed portion than in the unexposed portion, that is, the exposed portion was selectively dyed. This fact is also clear from the fact that a sharp red image was obtained by removing the silver image with a Farmer's reducer. Also as the density of silver image in Sample 1 and Sample 11 was low, a sharp red image was obtained without removing the silver image.

EXAMPLE 2

The same procedure as in Example 1 was followed using 30 mg. of dimethyl-p-phenylenediamine sulfate, methyl-p-aminophenol sulfate, p-phenylenediamine, or 2-amino-5-dimethylaminotoluene as the p-substituted reducing agent. The composition of the processing solution was the same as that of Example 1 except for the reducing agent and the amount thereof and the pH of the solution was 9.0. After allowing the sample to stand for 10 minutes at 30°C., the sample thus processed was subjected to the after treatment of Example 1. However, the increase of density by dyeing of the image portion was not observed and hence the image consisted of only the silver image and no polymerization reaction occured.

EXAMPLE 3

The same procedure as in Example 1 was followed using p-aminophenol as the reducing agent. As the processing solution was used one having composition A, B, C, or D shown in the following table.

| Component | A | B | C | D |
|---|---|---|---|---|
| Sodium methacrylate (g) | 75 | 75 | 75 | 75 |
| Potassium methabisulfite (g) | — | 3 | — | 3 |
| p-Aminophenol (mg) | 11 | 11 | 110 | 110 |
| 2 N sodium hydroxide (ml) | 75 | 75 | 75 | 75 |
| pH of the system | 8.03 | 8.00 | 8.05 | 8.00 |

After being allowed to stand for 15 minutes at 30°C., the sample was subjected to the same after treatment as in Example 1. On observing the sample before dyeing, it was found that a faint brown silver image was observed on the sample processed in solution A, a silver image was only slightly noticable in solution B, a dense brown image was formed in solution C, and a very dense brown image was obtained in D, although the density was weaker than in the case of processing in solution C.

Thereafter, by processing each sample with dyeing solution and subjecting it to the treatment, the increase in density by dyeing in a dye was not observed, which showed that no polymer was formed.

In addition, when the developing procedure for Sample A was continued further for 50 minutes, the density of image was increased, but the density of image by dyeing was not observed, that is, the formation of polymer was not observed. This was also true in the case of employing solution D.

EXAMPLE 4

The same procedure as in Example 1 wa followed using processing solutions A or B having the compositions as shown in the following table:

| Component | A | B |
|---|---|---|
| Sodium methacrylate (g) | 75 | 75 |
| o-Phenylenediamine (g) | 1 | 1 |
| Potassium methabisulfite (g) | 3 | — |
| $H_2O$—1N—NaOH solution (ml) | 75 | 75 |
| pH of the system | 9.0 | 9.0 |

This experiment demonstrates the effects of sulfite ions on the process. After being allowed to stand for 20 to 30 minutes at 30°C., the processed sample was subjected to the after treatment as in Example 1. In this case, an increase in density by dyeing was observed for the sample processed in solution A, which showed the formation of a polymer image, while in the sample processed in solution B, only the silver image by development was observed but the formation of polymer was not observed.

The optical density to green light was measured as in Example 1, the results of which are shown in the following table.

| Solution | Time (min) | (C)(C-1) | (C-2) | (D)(D-1) | (D-2) |
|---|---|---|---|---|---|
| A | 20 | 0.07 | 0.50 | 0.10 | 2.26 |
| B | 30 | 0.09 | 0.30 | 0.30 | 0.60 |

(C) transmission density of unexposed area; (C-1) before dyeing; (C-2) after dyeing; (D) density of exposed area; (D-1) before dyeing; and (D-2) after dyeing.

As is clear from the above table, the density of the image before dyeing was higher in sample B than sample A but the density after dyeing was very low in sample B as compared with sample A. Moreover, the sample B, that is, the sample processed in processing solution B, was processed for a longer period of time, the increase in density of image by dyeing was lower than that of sample A.

What is claimed is:

1. A process for forming a polymer image which comprises exposing a photographic silver halide emulsion layer so as to provide a latent image and subsequently developing said latent image with at least one compound selected from the group consisting of an o-dihydroxybenzene and its derivatives represented by the general formula (I)

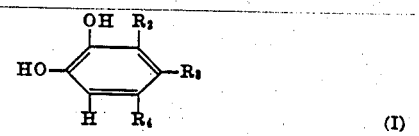

(I)

wherein $R_2$ represents a hydrogen atom or a hydroxyl group, $R_3$ represents a hydrogen atom or an alkyl group, and $R_4$ represents a hydrogen atom or a methoxycarbonyl group; an o-aminophenol and its derivatives represented by the general formula (II)

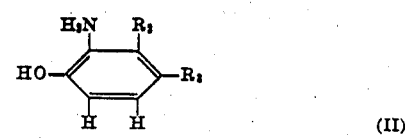

(II)

wherein $R_2$ represents a hydrogen atom or a hydroxyl group and $R_3$ represents a hydrogen atom or an amino group; and an o-phenylenediamine and its derivatives represented by the general fromula (III)

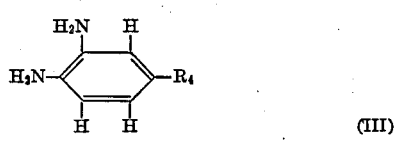

wherein $R_4$ represents a hydrogen atom, an alkyl group or an amino group in the presence of at least one compound selected from the group consisting of addition-polymerizable vinylidene monomers and addition-polymerizable vinyl monomers and in the presence of sulfite ions, whereby said monomer is polymerized at the latent-bearing areas of the emulsion layer.

2. A process in accordance with claim 1 which additionally comprises dyeing the polymer image thus formed with a dye which has a charge opposite to the charge of the image polymer when the dye is electrolytically dissociated.

3. The process of claim 2, wherein said polymer stems from a monomer having a negative charge, said monomer selected from the group consisting of vinyl compounds having a carboxyl group, vinyl compounds having an ammonium salt or metal salt of a carboxylic group, vinyl compounds having a sulfonic acid group, and vinyl compounds having an ammonium salt or metal salt of sulfonic acid.

4. The process of claim 2, wherein said polymer stems from a monomer having a positive charge, said monomer being a member selected from the group consisting of vinyl compounds having a basic nitrogen atom and vinyl compounds having a nitrogen atom of a quaternary salt.

5. The process of claim 2, wherein a water-soluble addition-poly-merizable vinyl monomer carrying no charge may be used in combination with the charged monomer serving as the polymer image precursor.

6. The process of claim 5, wherein said water-soluble addition-polymerizable vinyl monomer is a member selected from the group consisting of acrylamide, N-hydroxymethyl acrylamide, methacrylamide, methyl methacrylate, vinylpyrrolidone, N,N-methylenebis (acrylamide), triethylene-glycol dimethacrylate, and polymethyleneglycol dimethacrylate.

7. The process of claim 2, wherein said dye is an acid dye and a member selected from the group consisting of Acid Yellow No. 7, Acid Yellow No. 23, Acid Red No. 1, Acid Red No. 52, Acid Blue No. 9, Acid Blue No. 45, Acid Blue No. 62, and Acid Violet No. 7.

8. The process of claim 2, wherein said dye is a basic dye and a member selected from the group consisting of Basic Yellow No. 1, Basic Yellow No. 2, Basic Red No. 1, Basic Red No. 2, Basic Blue No. 25, Basic Violet No. 3, and Basic Violet No. 10.

9. The process of claim 1, wherein said compound is a member selected from the group consisting of catechol, 4-methylcatechol, 4-t-butyl catechol, pyrogallol, methyl gallate, pyrogallol red, o-aminophenol, amidol, 2-aminoresorcinol, o-phenylenediamine, tolyene-3, 4-diamine, 1,2,4-triaminobenzene and alizarine.

10. The process of claim 1, wherein the high molecular weight material maintained in the silver halide emulsion layer is gelatin.

11. The process of claim 1, wherein the high molecular weight material maintained in the silver halide emulsion layer is a member selected from the group consisting of polyvinyl alcohol, polyvinyl pyrrolidone, polyacrylamide, carboxymethyl cellulose, cellulose oxyethyl ether, and dextran, or mixtures of the same with gelatin.

12. The process of claim 1, wherein said sulfite ion stems from a precursor selected from the group consisting of an alkali metal, ammonium sulfite, an alkali metal bisulfite, and ammonium bisulfite.

13. The process of claim 1, wherein said sulfite ion stems from a precursor capable of yielding sulfite ions upon hydrolysis, said precursor being a member selected from the group consisting of pyrosulfites of alkali metals, ammonium pyrosulfites, and adducts of bisulfites with aldehydes.

14. The process of claim 13, wherein said aldehyde is a member selected from the group consisting of formaldehyde and glyoxal.

15. The process of claim 1, wherein said sulfite ion is present in an amount greater than 0.05 mole per liter of reaction system.

16. The process of claim 1, wherein said sulfite ion is present in an amount greater than 0.2 mole per liter of reaction system.

17. The process of claim 1, wherein said vinyl compound is a member selected from the group consisting of acrylamide, acrylonitrile, N-hydroxymethylacrylamide, methacrylic acid, acrylic acid, calcium acrylate, sodium acrylate, ethyl acrylate, vinylpyrrolidone, vinylmethyl ether, vinylbutyl ether, vinylisopropyl ether, vinylisobutyl ether, vinyl butyrate, 2-vinylpyridine, 4-vinylpyridine, 2-methyl-N-vinyl imidazole, potassium vinylbenzene sulfonate, and vinyl carbazole dicyclopentadiene methacrylate.

18. The process of claim 1, wherein said vinyl compound is a member selected from the group consisting of N,N'-methylene-bisacrylamide, ethylene glycol dimethacrylate, diethylene glycol dimethacrylate, triethylene glycol dimethacrylate, polyethylene glycol dimethacrylate, divinyl ether, divinyl benzene, bisphenol-A-dimethacrylate, butylene-di-methacrylate, and pentaerythritol tetraacrylate.

19. The process of claim 1, wherein said process is carried out at a pH of greater than about 6.

20. The process of claim 1, wherein said process is carried out at a pH of greater than 7.

21. The process of claim 1, further comprising the presence of a thermal polymerization inhibiting amount of a thermal polymerization inhibitor.

22. The process of claim 21, wherein said inhibitor is a member selected from the group consisting of p-methoxyphenol, hydroquinone, alkylhydroquninone, and 2,6-di-t-butyl-p-cresol.

23. The process of claim 21, wherein said polymerization inhibitor is present in an amount of from 10 ppm to 1/00 ppm of the weight of said vinyl compound.

24. The process of claim 1, wherein said vinyl compound is present in an amount of from 1/30 to 30 times the weight of the high molecular weight material of the silver halide emulsion.

25. The process of claim 24, wherein the vinyl compound is present in an amount of from ¼ to 4 times the weight of the high molecular weight material of the silver halide emulsion.

26. The process of claim 1, wherein said silver halide is present in an amount of 1/20 to 2 times the weight of the high molecular weight material of the silver halide emulsion.

27. The process of claim 26, wherein said silver halide is present in an amount of from 1/10 to ½ times the weight of the high molecular weight material of the silver halide emulsion.

28. The process of claim 1, wherein said compound is present in an amount of from 1/1000 to 20 moles per mole of silver halide.

29. The process of claim 1, wherein said compound is present in a processing solution, in a concentration of from 1/10,000 to 3.0 moles per liter of solution.

30. The process of claim 29, wherein said concentration ranges from 1/3000 to 1 mole per liter.

* * * * *